(12) United States Patent
Yokota et al.

(10) Patent No.: US 6,282,330 B1
(45) Date of Patent: *Aug. 28, 2001

(54) IMAGE PROCESSING APPARATUS AND METHOD

(75) Inventors: Masayuki Yokota; Hitoshi Onoda, both of Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/025,433

(22) Filed: Feb. 18, 1998

(30) Foreign Application Priority Data

Feb. 19, 1997 (JP) .................................................. 9-035362

(51) Int. Cl.[7] ........................................................ G06K 9/03
(52) U.S. Cl. ............................ 382/309; 382/305; 358/452
(58) Field of Search .................................... 382/299, 309, 382/305; 358/451, 448, 452; 345/428

(56) References Cited

U.S. PATENT DOCUMENTS

| 5,121,448 | | 6/1992 | Katayama et al. ..................... 382/57 |
| 5,153,936 | * | 10/1992 | Morris et al. ......................... 345/428 |
| 5,185,674 | * | 2/1993 | Tai ........................................ 358/457 |
| 5,301,037 | * | 4/1994 | Kang et al. ........................... 358/451 |
| 5,436,733 | * | 7/1995 | Terada et al. ......................... 358/448 |
| 5,467,202 | * | 11/1995 | Washino et al. ...................... 358/448 |
| 5,754,710 | * | 5/1998 | Sekine et al. ......................... 382/300 |

* cited by examiner

Primary Examiner—Yon J. Couso
(74) Attorney, Agent, or Firm—Fitzpatrick, Cella, Harper & Scinto

(57) ABSTRACT

Low-resolution image data and high-resolution image data of an image to be processed are stored, and designations (instructions) for plural kinds of image processes to be performed on the image are registered in relation to the image. The registered designations are commonly used to process the both low- and high-resolution image data. Upon registering the designations, the image processes are divided into a plurality of command groups depending upon the characteristics of each image process.

33 Claims, 11 Drawing Sheets

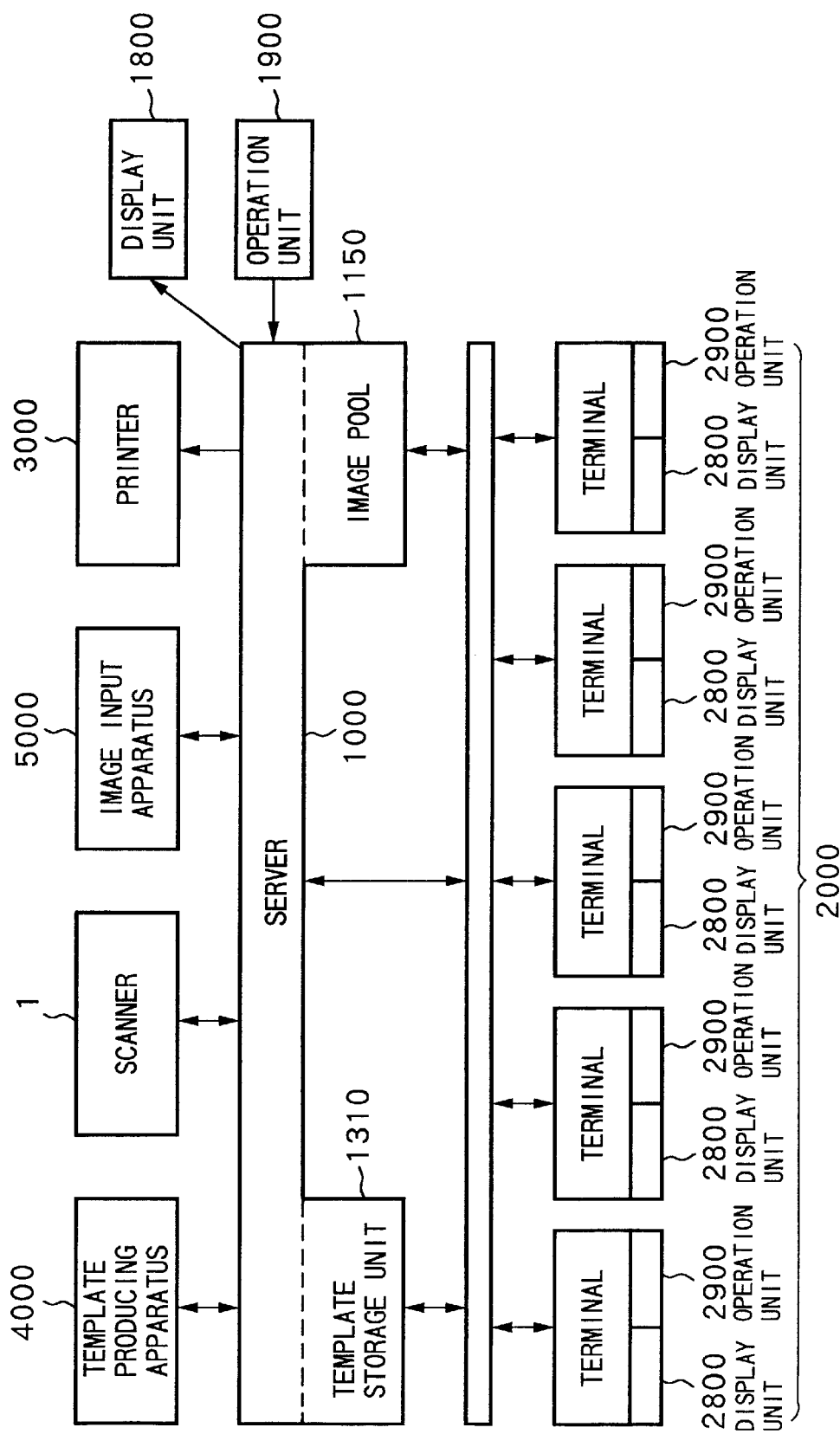

FIG.5

| OPERATOR A | | | | OPERATOR B | --- |
|---|---|---|---|---|---|
| BOOK X | | | ----- | | |
| PAGE 1 | PAGE 2 | | | | |
| TEMPLATE α | TEMPLATE β | | | | |
| TEMPLATE PARAMETER INFORMATION | TEMPLATE PARAMETER INFORMATION | | | | |
| IMAGE 1 | | | | | |
| CORRECTION COMMAND GROUP | | | ----- | | |
| EDITORIAL COMMAND GROUP | | | | | |
| IMAGE 2 | | | | | |
| IMAGE 3 | | | | | |
| IMAGE 4 | | | | | |

900

IMAGE PROCESSING APPARATUS AND METHOD

BACKGROUND OF THE INVENTION

The present invention relates to an image processing apparatus and method.

An image processing system which reads an image using a scanner, performs a predetermined image processing on the read image using an image processing apparatus, such as a personal computer, and outputs the processed image to a monitor or a printer has been commonly known. In such the system, the resolution of the scanner is generally fixed, and an image to be processed is read in this fixed resolution.

Accordingly, in an ordinary image processing system which outputs an image in different resolutions when printing the image and when displaying the image, a scanner capable of reading the image in either the resolution used for printing or the resolution used for displaying is used in order to reduce processes of resolution conversion.

When outputting an image in a resolution which is different from that used when reading the image, the resolution of the image is converted by performing thinning or interpolation processing.

The resolution conversion is performed while outputting the image in most cases, therefore, the image processing apparatus has to perform the resolution conversion in synchronization with output timing, which is a considerable load on the image processing apparatus.

SUMMARY OF THE INVENTION

The present invention has been made in consideration of the above situation, and has as its object to provide a high-quality image processing apparatus and method capable of effectively designating image processes when outputting an image in a plurality of resolutions after performing the image processes designated for the image by an operator, as well as outputting the processed image at high speed.

Further, it is another object of the present invention to provide an image processing system, comprising a server and a terminal, capable of minimizing the amount of data transmitted between the server and the terminal as well as performing desired image processes on an image stored in the server in response to an operation by an operator performed in the terminal, further outputting a resultant image from the server.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiment of the invention and, together with the description, serve to explain the principles of the invention.

FIG. 1 is a block diagram illustrating a brief configuration of an image processing system according to an embodiment of the present invention;

FIG. 5 is a table formed in an image subsystem in the image processing system according to the embodiment of the present invention;

DETAILED DESCRIPTION OF THE PREFERRED EMBODIMENT

Figure 2A:
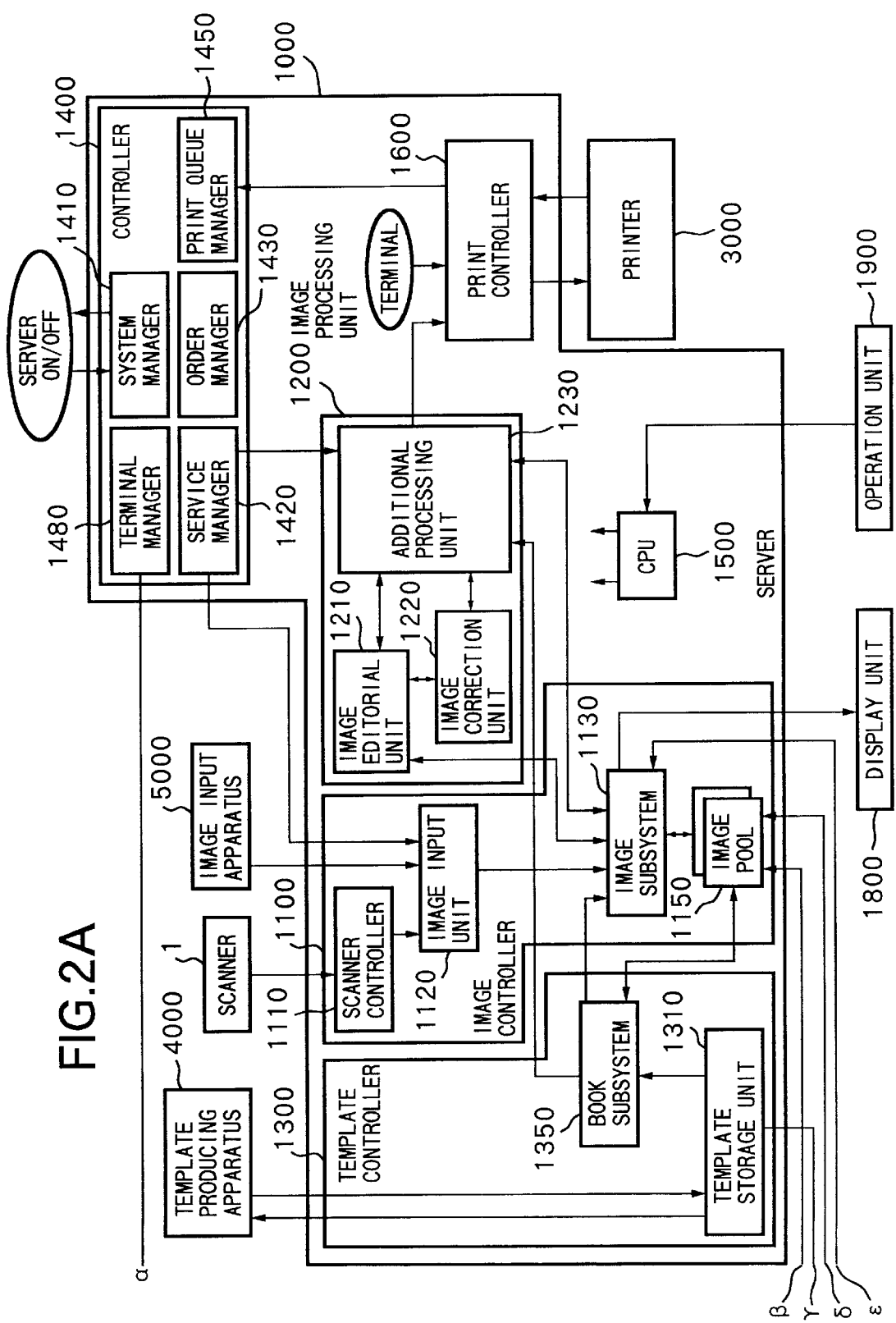
FIG. 2A is a block diagram illustrating a functional configuration of a server in the image processing system according to the embodiment of the present invention.

Operation and effect of an image processing system as a preferred embodiment of the present invention will be described in accordance with the accompanying drawings.

[Configuration of Image Processing System]

FIG. 1 is a block diagram illustrating a brief configuration of the image processing system according to the embodiment of the present invention.

Briefly, the image processing system inputs an original image in high resolution and in low resolution, designate a variety of image processes while referring to a displayed image on a display unit 1800 in low resolution, finally outputs a processed image in high resolution from a printer 3000. The image processing system can be controlled to perform various processes by interfacing with a server 1000 or a terminal 2000 at a remote location. In this image processing system, it is possible for an operator at home, for instance, to freely and easily process and edit photographs in a laboratory as a digital image, thereby make an original album, a postcard, an index sticker, and so on.

The image processing system includes a template producing apparatus 4000, a scanner 1, and an image input apparatus 5000 for inputting images, where all are connected to the server 1000. Further, the server 1000 has a template storage unit 1310 for storing images of templates (simply called as "templates" hereinafter) generated by the template producing apparatus 4000 and an image pool 1150 for storing input images. A template corresponds to a mount of an album on which an image or images are pasted. Alternately, the template may have a window or windows (slots) where an image or images are embedded (pasted), and is colored with a solid color, a picture and/or a pattern.

The scanner 1 is an apparatus for reading an image from an image recording medium, such as a sheet and a film, on which a color or monochromatic image is recorded as a negative or positive image. The template producing apparatus 4000 is for generating and changing digital data representing a template. Further, the image input apparatus 5000 is for reading an image from a storage medium which stores digital images and outputting the read image to the server 1000. As the image input apparatus 5000, a CD-ROM driver, for example, may be used. The template inputted from the template producing apparatus 4000 is stored in a template storage unit 1310 and image data inputted from the scanner 1 and the image input apparatus 5000 is stored in the image pool 1150.

The scanner 1 and the image input apparatus 5000 input two kinds of image data of an original image to the server 1000; low-resolution image data and high-resolution image data. Then, the server 1000 outputs the low-resolution image data, out of the two kinds of inputted image data, to the display unit 1800 to display the image in low-resolution. The operator designates processes to be performed on the image using an operation unit 1900 while watching the image displayed on the display unit 1800. The processed image can be confirmed on the display unit 1800. The type of the designated image process and parameters which represent a range of the image to be processed, for instance, are stored in a predetermined area of the server 1000 as a command in relation to parameters which identify the operator and the original image. Upon printing the image after finishing to designate image processes, the high-resolution image data corresponding to the processed image is read out from the image pool 1150, and image processes are performed on the high-resolution image data in accordance with the stored commands. Then, a high-resolution image, processed with the designated image processes, is outputted from the printer 3000.

A plurality of terminals 2000 are provided in the image processing system, and there are many operators using the terminals 2000. Each operator operates a terminal 2000 to read and receive low-resolution image data of images which the operator wants to process, and templates from the image pool 1150 and the template storage unit 1310 of the server 1000. The received low-resolution image data and the templates are stored in the terminal 2000, and displayed on a display unit 2800. The operator designates image processes to be performed on the image using an operation unit 2900 while watching the image displayed on the 2800. Here, it is possible to confirm the processed image on the display unit 2800. When image processes are designated, the type of the designated image process and parameters representing, e.g., a range of the image to be processed are stored as a command in a predetermined area of the terminal 2000 in relation to parameters which identify the operator and the original image. Upon printing the image after finishing to designate image processes, the stored commands and parameters are sent to the server 1000. When the server 1000 receives a print instruction, the command from the terminal 2000, it reads the high-resolution image data corresponding to the processed image from the image pool 1150. Then, image processes are performed on the high-resolution image data in accordance with the stored commands, and outputted to the printer 3000. Accordingly, a high-resolution image, processed with the image processes designated in the terminal 2000, is outputted from the printer 3000.

Figure 2B:
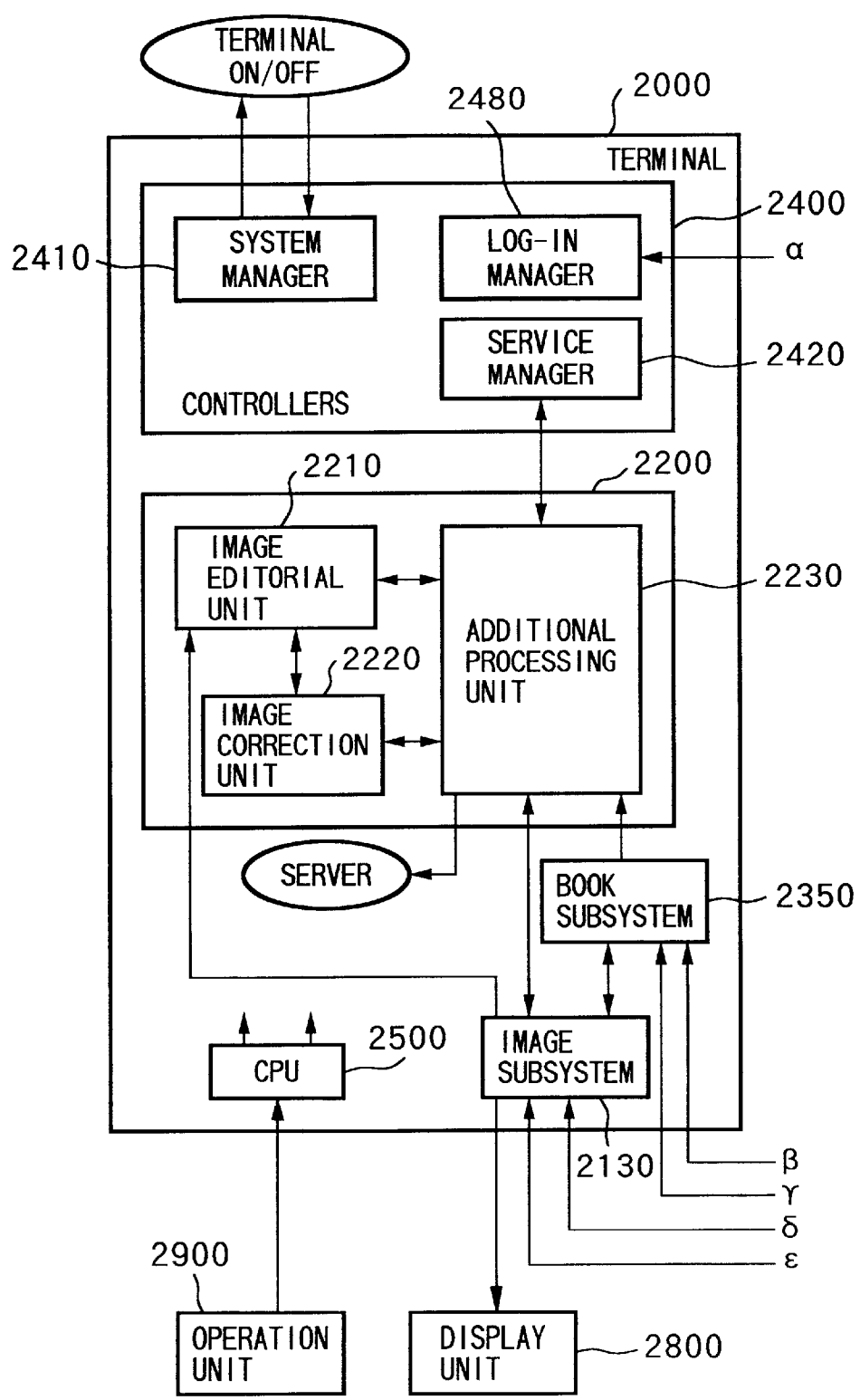
FIG. 2B is a block diagram illustrating a functional configuration of a terminal apparatus in the image processing system according to the embodiment of the present invention.

FIG. 2A is a block diagram conceptually illustrating an internal configuration of the server 1000 in the image processing system and FIG. 2B is a block diagram conceptually illustrating an internal configuration of the terminal 2000. Referring to FIGS. 2A and 2B, a functional configuration of the image processing system is explained below.

Lines α, β, γ, δ and ε in FIG. 2A are respectively connected to lines α, β, γ, δ and ε in FIG. 2B. More specifically, a terminal manager 1480 of the server 1000 is connected to a log-in manager 2480 of the terminal 2000, the image pool 1150 is connected to a book subsystem 2350 and an image subsystem 2130, the template storage unit 1310 is connected to an additional processing unit 2230.

In the server 1000, reference numeral 1100 denotes an image controller for reading and storing image data to be processed; 1200, an image processing unit for performing a variety of processes on the image data stored in the image controller 1100 and outputting the processed image information to the image controller 1100, a print controller 1600, and so on; and 1300, a template controller for storing and controlling various templates produced by the template producing apparatus 4000. Further, reference numeral 1400 denotes a controller for controlling the overall operation of the server 1000; and 1600, the print controller for controlling the printer 3000.

The image controller 1100 includes a scanner controller 1110 for controlling the reading of an image by the scanner 1, converting read analog image into digital image and outputting the digital image; an image input unit 1120 for inputting the digital image from the scanner controller 1110 and a digital image from the image input apparatus 5000; the image pool 1150 for storing the image inputted by the image input unit 1120, namely, image data to be processed; and an image subsystem 1130 for controlling reception and transmission of an image stored in the image pool 1150 from/to the image processing unit 1200 and the display unit 1800.

The image processing unit 1200 comprises an image editorial unit 1210 for receiving an image to be processed from the image controller 1100 and editing it; an image correction unit 1220 for performing various corrections, such as red-eye compensation, on the image to be edited by the image editorial unit 1210; and an additional processing unit 1230 for performing additional processes, such as enlargement and panoramic synthesis, on the processed image.

The template processing unit 1300 includes the template storage unit 1310 for obtaining a various templates which are produced in advance by a designer, for instance, using an external device, such as the template producing apparatus 4000, via on-line communication or via a recording medium, such as CD-ROM, as well as outputting the obtained templates to an external device, such as the template producing apparatus 4000; and a book subsystem 1350 for performing template-related control, such as to combine a template stored in the template storage unit 1310 and an image stored in the image pool 1150 and to output the combined image to the image subsystem 1130, and controlling the storing of a command to be applied to a template.

Note, a book which is a group of templates made up into a book form, a photograph for forming a background image, an image which can be clipped as a background image, and photo-border, for instance, are stored in the template storage unit 1310, as templates.

Further, the controller 1400 includes a system manager 1410 for controlling the overall operation of the image processing system; a service manager 1420 for mainly controlling the additional processing unit 1230 and the image input unit 1120, for instance; an order manager 1430 for managing an order from a customer; a print queue manager 1450 for controlling print queue of the print controller 1600; and the terminal manager 1480 for managing reception/transmission of an instruction, including log-in and log-out instructions, between the sever 1000 and each terminal 2000.

Referring to FIG. 2B, each terminal 2000 has an image processing unit 2200 having the same configuration as that of the image processing unit 1200 of the server 1000, the image subsystem 2130 also having the same configuration as that of the image subsystem 1130, and the book subsystem 2350 having the same configuration as that of the book subsystem 1350.

Figure 3:
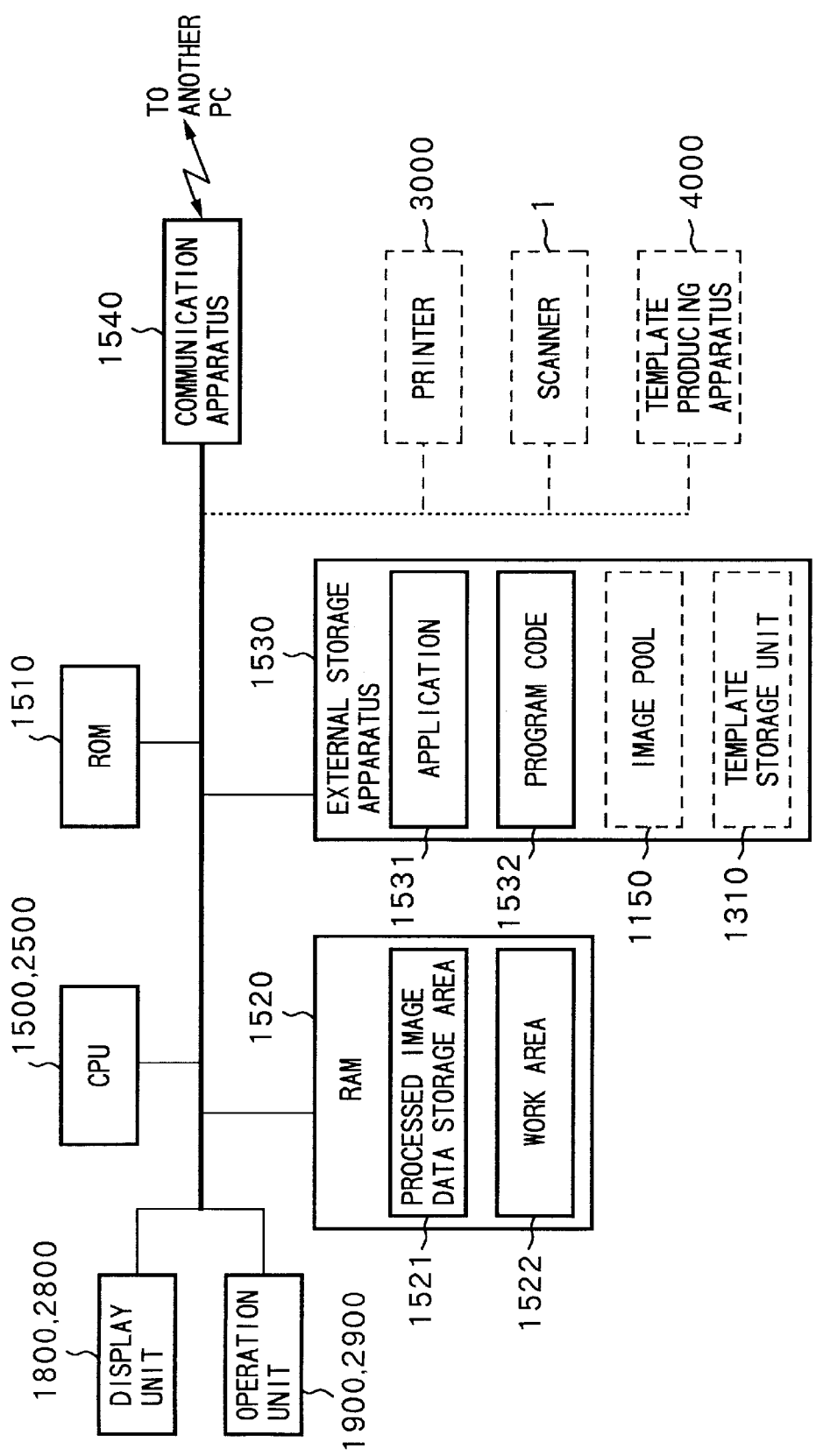
FIG. 3 is a block diagram illustrating a hardware configuration of the server apparatus or the terminal apparatus in the image processing system according to the embodiment of the present invention.

As the server 1000 and each terminal 2000 having the aforesaid functions, a personal computer having a hardware configuration as shown in FIG. 3 can be used.

Reference numerals 1500 and 2500 denote CPU for operation and control for controlling the overall operation of the personal computer; 1510, a ROM for storing a program to be executed by the CPU 1500 or 2500 and fixed values; 1520, a RAM as a temporary storage including a work area 1522 for executing various programs stored in the image controller 1100, the image processing units 1200 and 2200, the template controller 1300, and controllers 1400 and 2400, all of which are shown in FIGS. 2A or 2B, and a processed image data storage area 1521; 1530, an external storage apparatus, such as a hard disk, for storing an application 1531 for performing image processes and program codes 1532 of the aforesaid various programs. Further, as the server 1000, the external storage apparatus 1530 further includes the image pool 1150 and the template storage unit 1310. Furthermore, the personal computer includes a communication apparatus 1540, thereby, the server 1000 and each terminal 2000 can exchange data. To the server 1000, the printer 3000, the scanner 1, the template producing apparatus 4000, and so on, are connected.

[Inputting of Image Data]

Figure 4:
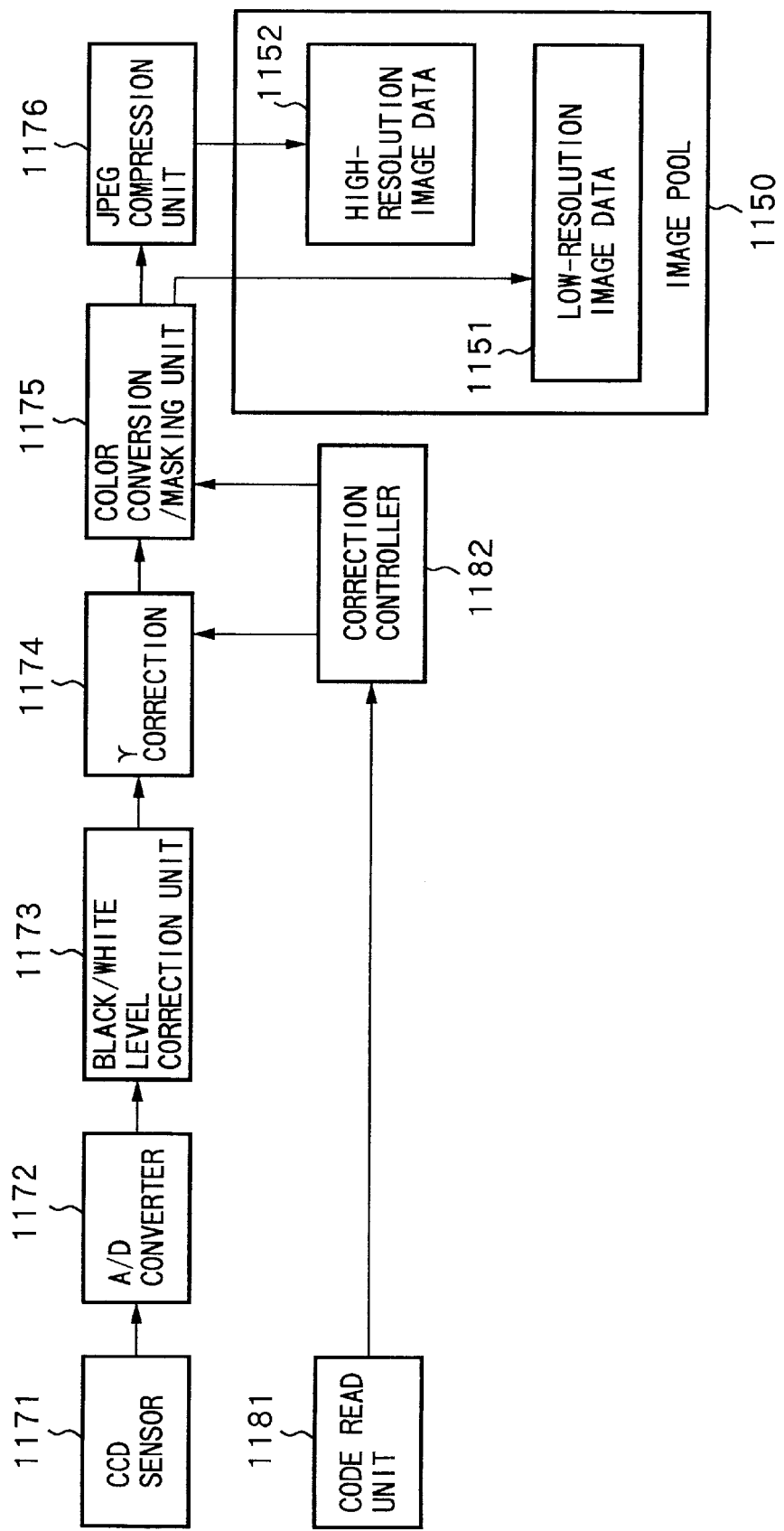
FIG. 4 is a block diagram illustrating a brief configuration of an image input unit 1120 shown in FIG. 2B.

Next, a method of inputting and administrating image data according to the embodiment is explained with reference to FIG. 4 as a feature of the present invention. FIG. 4 is a block diagram mainly illustrating a brief configuration of the image input unit 1120.

Here, control processing since image data is read by the scanner 1 until it is stored in the image pool 1150 via the image input unit 1120 is explained.

First, a developed film or a photograph is read by a CCD sensor 1171 of the scanner 1, and converted into a digital signal by an analog-digital (A/D) converter 1172. Thereafter, the digital signal is applied with black/white level correction in a black/white level correction unit 1173, then applied with γ correction in a γ correction unit 1174, further applied with a predetermined color conversion and masking processing in a color conversion/masking unit 1175.

In this image processing system, high-resolution image data (fine image) of 1024×1536 or 2048×3072 pixels per frame is inputted for printing, and low-resolution image data (proxy image) of 256×384 pixels per a frame of the same image is inputted for displaying by reading an identical original image. Thus, two types of image data of the same image is inputted and stored in the image pool 1150. For example, image data read during prescanning by the scanner 1 is stored as low-resolution image data 1151, and image data read during fine scanning is stored as high-resolution image data 1152.

When it is determined that the image is read by the CCD sensor 1171 in a low resolution, the output from the color conversion/masking unit 1175 is directly stored in the image pool 1150 as the low-resolution image data. Whereas, if it is determined that the image is read by the CCD sensor 1171 in a high resolution, the output from the color conversion/masking unit 1175 is sent to a JPEG compression unit 1152, and the data compressed in the JPEG compression unit 1152 is stored in the image pool 1150 as the high-resolution image data 1152.

If an image read by the scanner 1 is recorded on an advanced photo system (APM™) film, data, such as image sensing conditions, is recorded on the film as IX information when sensing the image. Accordingly, the IX information is read by a code read unit 1181, and a correction controller 1182 controls a γ correction value used in the γ correction unit 1174 as well as color conversion and masking amount used in the color conversion/masking unit 1175 in accordance with the IX information.

Note, in a case where image data is inputted by the image input apparatus 5000, the image data is processed in the similar manner as described above except image processes start from the process performed in the black/white level correction unit 1173 which processes the digital data converted by the A/D converter 1172.

In a case where either low- or high-resolution image data is inputted, the inputted image data is processed with resolution conversion, such as thinning and interpolation. Then, the unprocessed inputted image data and the image data which is applied with the resolution conversion are stored in the image pool 1150 as a pair of low- and high-resolution image data.

[Designation for Image Process]

Next, designation processing by the operator relating to image data stored in the image pool 1150 as described above and an operation of the image processing system in response to the designation (instruction) are explained. First, a case where the operator inputs a designation from the server 1000 is explained.

First, the operator selects a template, and sets various parameters for the template (e.g., the number of images to be pasted, character input, design of background and slot window), further designates an image or images to be pasted. Then, for each image to be pasted, the operator inputs designations (instructions) for editorial processes, such as the direction and trimming of the image, when necessary. Further, the operator instructs correction processes, such as red-eye compensation. When designations for editorial and correction processes have been inputted for all the image or images to be pasted in one page (i.e., one template), the operator confirms a page layout of the edited image on the display unit 1800. If the operator is satisfied with the displayed image, then instructs to print out the image. Note, in a case where the operator wishes to print out plural copies of the image, and in a case where the operator wants to enlarge the image, for instance, designation for an additional process is required.

Among these designations, information on the selection of a template (referred to as "template selection information" hereinafter) and information on the set parameters for the template (referred to as "template parameter information" hereinafter) are stored in the book subsystem 1350 in correspondence to each other. A group of templates (referred to "book" hereinafter) is prepared for a case where a plurality of templates have to be selected for making an album. When a book is selected, instead of a template, information on templates is stored by book.

For respective pages of the book, the template selection information and the template parameter information for respective templates are stored. Further, information on the selection of an image or images to be pasted on each template and information on processes to be applied to the selected image or images are stored in relation to each template. Before selecting an image, information on each template is stored in the book subsystem 1350 along with identification of the operator who generated the book. After an image or images are selected and allocated in a template, information on the template is transmitted to the image subsystem 1130, thereby a table 900, as shown in FIG. 5, is generated in the image subsystem 1130. After a command or commands of image processes for each image are inputted, the commands are inserted in predetermined positions in the table 900.

In the table 900, data is registered by operator, and for a given operator, data is grouped by book, and data in a given book is grouped by page. For a given page, template selection information (e.g., templates α and β), template parameter information, and an image or images to be pasted, and command groups for each image are registered in relation to each other.

Note, the inputted commands are registered as a function while classifying whether a command requests a correction process or an editorial process when they are registered.

More specifically, the correction process is performed by the image correction unit 1220, and designated commands requesting correction processes are registered as a group (correction command group). Further, the editorial process is performed by the image editorial unit 1210, and designated commands requesting editorial processes are registered as another group (editorial command group).

Each command group is stored in the table 900 of the image subsystem 1130, and the image subsystem 1130 executes desired image processes by controlling the image processing unit 1200 by transmitting a function, corresponding to the desired command group, to the image processing unit 1200.

Figure 6:
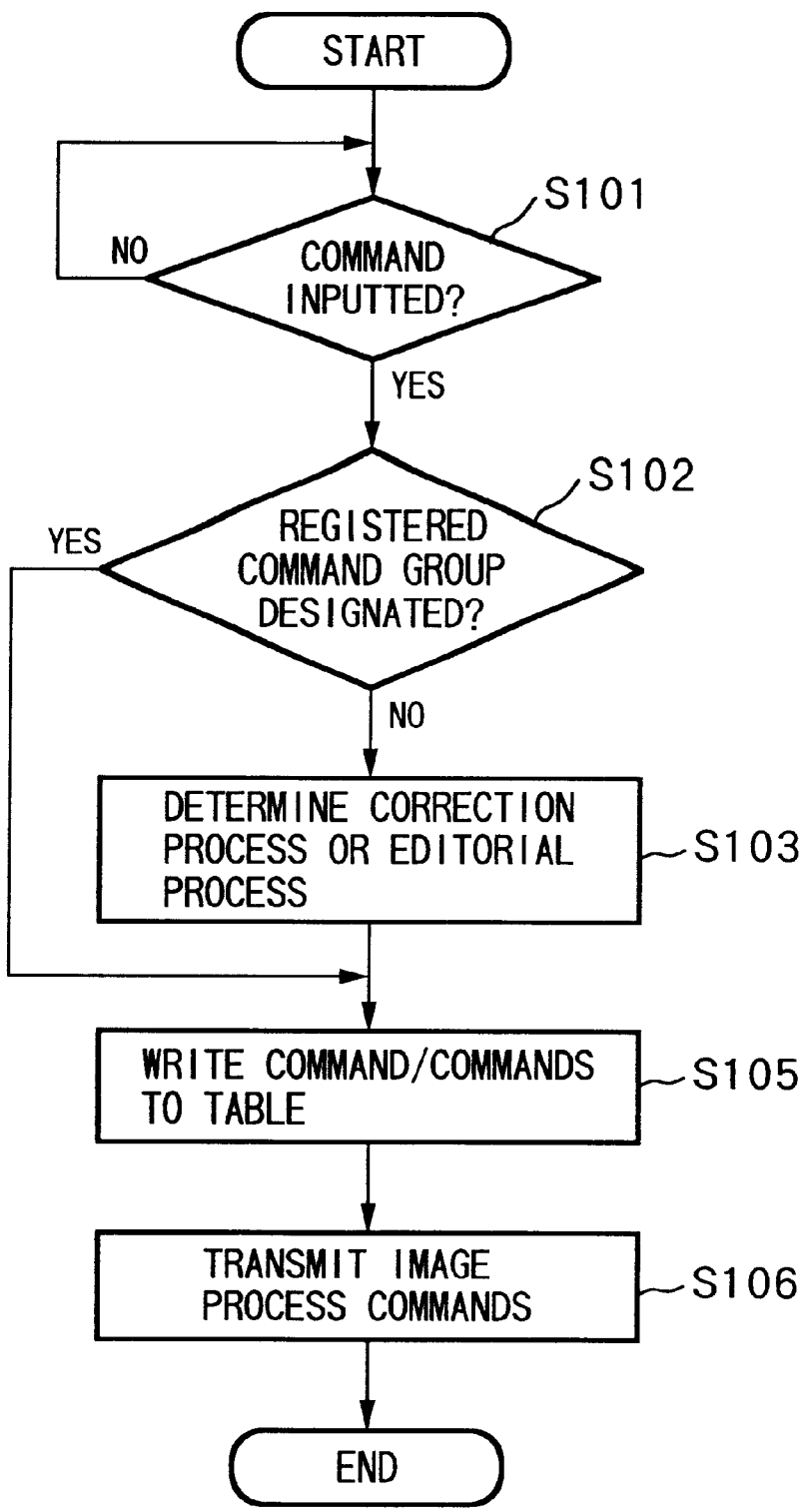
FIG. 6 is a flowchart showing a flow of processing in the image subsystem in the image processing system according to the embodiment of the present invention.

The operation of the image subsystem 1130 is as shown by a flowchart in FIG. 6. In step S101, the process waits for a command to be inputted, and when a command is inputted, the process proceeds to step S102. In step S102, whether or not the inputted command designates a command group which has been registered is determined. If the command designates a registered command group, then the process proceeds to step S105 where the image subsystem 1130 copies the designated command group stored in the table 900 to a predetermined area, in the table 900, reserved for an image under process. Otherwise, the process proceeds from step S102 to S103 where whether the command is for a correction process or an editorial process is determined. Thereafter, the process proceeds to step S105, and the command is registered either as a correction command group or an editorial command group. In short, the inputted command is written in a predetermined position of the table 900. After finishing writing the command or commands to the table 900 in step S105, the process proceeds to step S106 where the image subsystem 1130 reads image data from the image pool 1150. Then, the image subsystem transmits a function corresponding to the correction command group and a function corresponding to the editorial command group which are registered in relation to the read image data to the image processing unit 1200 along with the image data.

The image processing unit 1200 receives the functions and the image data, and editorial processes corresponding to the function, representing the editorial command group, are performed by the image editorial unit 1210, whereas correction processes corresponding to the function, representing the correction command group, are performed by the image correction unit 1220.

After all the processes registered in the table have been performed, then the image is transmitted to the image subsystem 1130, and the processed image is displayed on the display unit 1800. In response to a designation, by the operator, to display the processed image, when a page layout is desired, the processed image is pasted on a template read out from the template storage unit 1310 in the image subsystem 1130, then a page image is outputted to the display unit 1800. Whereas, if a print instruction is inputted from the operation unit 1900, high-resolution image data of an image or images in a desired page to be printed is read out from the image pool 1150, edited and corrected in the image processing unit 1200, then outputted to the print controller 1600.

Next, relationship between image data when image processes are designated as described above and command or commands for designating image processes is further described in detail with reference to FIG. 7.

Figure 7:
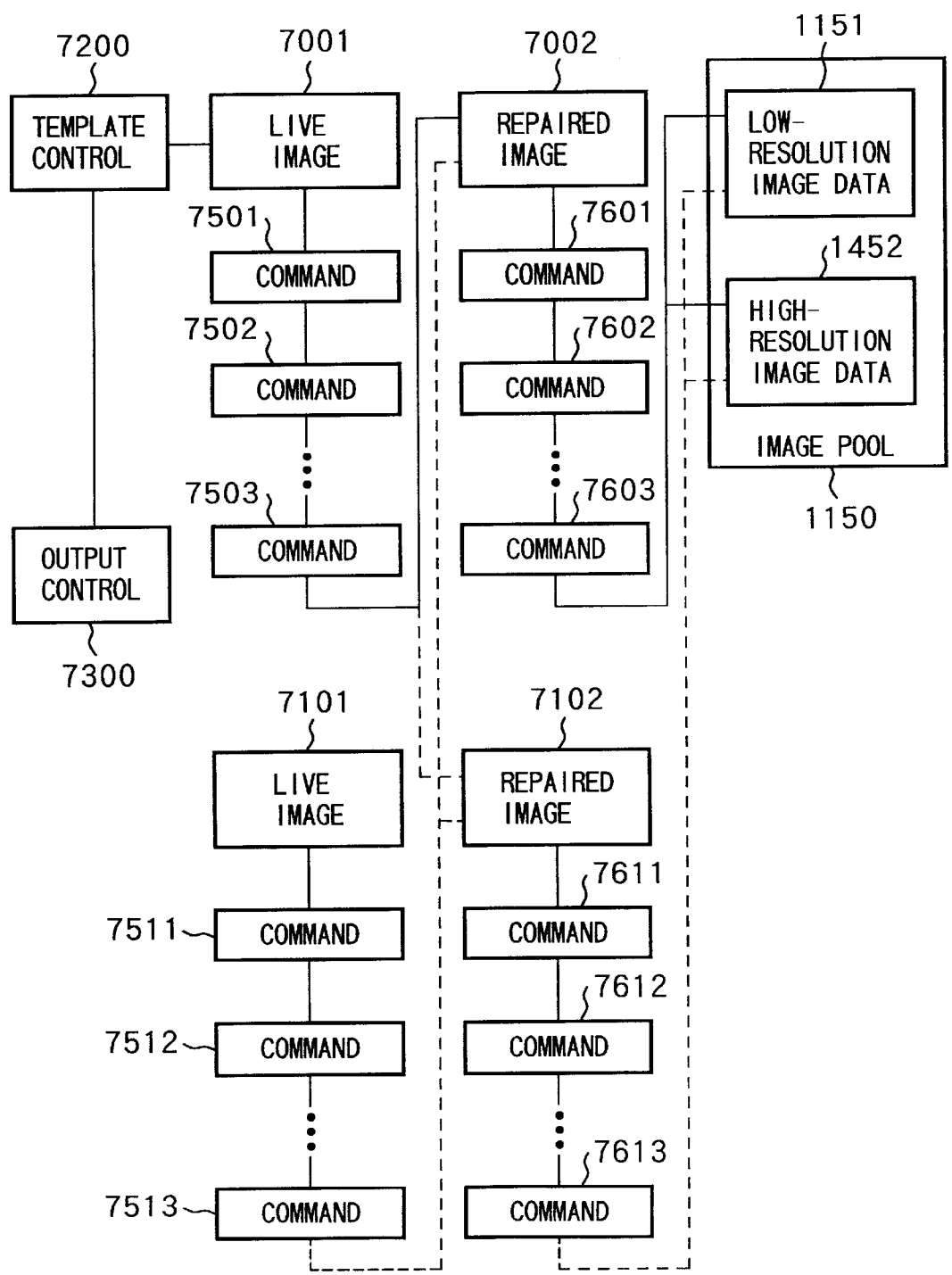
FIG. 7 is an explanatory view showing relationship between image data to be processed and image processes in the image processing system according to the embodiment of the present invention.

An inputted command to designate an image process is stored in relation to each image, as shown in FIG. 7, either in the book subsystem 1350 or in the image subsystem 1130 along with image data of the image.

Referring to FIG. 7, reference numeral 1151 denotes the low-resolution image data stored in the image pool 1150 and reference numeral 1152 denotes the high-resolution image data also stored in the image pool 1150.

Below, these data of two different resolutions are called "original image data", and an operation mainly in the sever 1000 is explained.

Reference numeral 7001 denotes image data in a state ready for displaying or printing (live image); 7002, image data as a result of correction performed on the original image data (repaired image); 7200, template control for the live image 7001 by the book subsystem 1350 (selection of a type of template, pasting of the live image 7001 in the template); and 7300, output processing for displaying or printing the image data arranged on the template after the template control.

Reference numerals 7501 to 7503 are a command group for designating editorial processes (editorial command group), such as a template type, the pasting position of an image on the template, an angle of rotation of the image, color or white designation. Reference numerals 7601 to 7603 are a command group for designating correction processes (correction command group), such as red-eye compensation, color correction for a part of the image, and removal of scratch and stain.

For example, in a case where the operator designates a template, an image to be pasted and its position (e.g., ordinal number) in the template, the position information is stored as the command 7501. Since other command has not been designated, yet, in this state, the image subsystem 1130 reads the low-resolution image data 1151 and pastes it on the template at the designated position in accordance with the command 7501. As a whole, an unprocessed low-resolution image is pasted on the designated template at the designated position, and the obtained image is displayed in the display unit 1800.

Next, when the first image process is designated, if the designation is an editorial process, the designation is stored as the command 7502. For example, if the designation instructs to rotate the image by 90 degrees, this designation is registered as the command 7502. In this stage, the low-resolution image data 1151 is rotated by 90 degrees as specified by the command 7502, thereafter, the rotated image is pasted at the position, specified by the command 7501, on the template. Thus, as a whole, an image of the template including the rotated image pasted at the desired position is displayed on the display unit 1800.

Whereas, when a correction process, such as fixing of a scratch, if there is any scratch in the image, or red-eye compensation, is designated, the designation for the image process is converted into a corresponding command, and registered in a correction command group along with parameters, such as information on an area, to be processed, in the image.

As correction processes are designated, these designations are registered as the commands 7601 to 7603 of the correction command group. Then, the low-resolution image data 1151 is read and applied with correction processes corresponding to the commands from 7603 to 7601 (in this descending order), thereby generating a repaired image. This repaired image is obtained as a result of the correction operation, but not displayed in the display unit 1800 nor printed out by the printer 3000.

The repaired image is successively applied with editorial processes corresponding to the commands from 7503 to 7501 (in this descending order) of the editorial command group. As a result, a live image is generated and displayed on the display unit 1800.

As described above, as an image process is designated, the designation is written as one of the commands 7501 to 7503 or 7601 to 7603, thereby the number of commands, shown in FIG. 7, in each group increases. Further, as a new image process is designated, processes corresponding to the commands from 7603 to 7501 are performed on the low-resolution image data 1151 and displayed, therefore, an image displayed on the display unit 1800 changes. Thus, it is possible for the operator to obtain a desired image by adding and canceling designation for an image process and by changing parameters of image correction processes while watching the changing image displayed on the display unit 1800.

Here, each command group is stored in the table 900 in the image subsystem 1130, and the image subsystem 1130 reads each command group as functions for performing image processes, and controls the image processing unit 1200 in accordance with the read functions to execute desired image processes.

Note, an original image may be pasted on two different templates and outputted independently, in some cases. In such cases, editorial processes and/or correction processes, designated for pasting the image on one template, may be performed for processing the image to paste it on the other template.

Registration of editorial command groups and correction command groups are performed independently. These command groups can be executed in various combinations. For example, it is possible to perform correction processes on an original image on the basis of a correction command group which is registered previously, and apply new editorial processes to a repaired image, obtained as a result of corrections, and paste a live image obtained as a result of editorial processes in an arbitrary template. In this case, it is possible to omit designating the same correction processes which have been performed previously.

For example, upon correcting the original image to generate the repaired image, the commands from 7603 to 7601, as described above, are performed. Then, on the obtained repaired image, instead of performing editorial processes designated by the commands 7503 to 7501, editorial processes designated by other commands 7513 to 7511 are performed. In this case, a live image 7101 is generated from the repaired image 7002.

In another example, when it is desired to apply editorial processes to an image on the basis of the commands 7503 to 7501, and with new correction processes on the basis of commands other than the commands 7603 to 7601, e.g., the commands 7613 to 7611 of another correction command group, may be designated for correcting the original image.

For example, assume that an original image is processed with a complicated correction processes, and the quality of the image is increased to a satisfactory level. Then, editorial processes are applied to an obtained repaired image and the resultant image is pasted on a template, thereby one page of an album is completed.

However, there is a case where, after the image is processed, the operator thinks that the processed image is suitable for the cover of the album. The operator wishes to use the repaired image obtained by applying the same correction processes to the same original image, but applying a different editorial process to change the color of the repaired image to sepia color before pasting the image on a template for the cover page. In this case, it is a waste of time to designate the complicated correction processes one by one to process the original image. Furthermore, if the correction processes are designated one by one, there would be a case where a different correction process is designated by mistake.

In such cases, the correction command group which has been registered previously is read out, and the identical correction processes are performed on the original image. Thereafter, different editorial operations may be performed in order to change the color of the image to sepia color. Accordingly, the original image can be easily and desirably processed to obtain an image to be pasted on the template of the cover page.

As described above, by registering commands by group as described above, it is unnecessary to designate the same image processes many times, thereby realizing effective image process designation.

Of course, instead of executing the commands 7603 to 7601 to generate a repaired image and the commands 7503 to 7501 to perform editorial processes, it is possible to input completely different commands 7613 to 7611 to generate a repaired image and the commands 7513 to 7511 to perform editorial processes.

Further, in a case where process or processes corresponding to one or more commands become unnecessary among a plurality of commands registered as a command group, the unnecessary command or commands can be canceled, thereby it is possible to perform desired image processes without affecting other commands.

The image subsystem 1130 registers designations of image processes to be applied to an original image as commands by group while linking the commands as they are inputted, as shown in FIG. 7. For displaying an image, the image subsystem 1130 reads low-resolution image data of the image from the image pool 1150 as well as sequentially reads command groups, as shown in FIG. 7, which are registered as image processing functions in relation to the image to be processed. Thereafter, the image subsystem 1130 controls the image processing unit 1200 to execute the necessary image processes in accordance with the contents of the command groups. After all the processes designated by the command groups are completed and the live image 7001 is generated, the live image 7001 is further processed with the template control 7200, thereafter, the output control 7300. Finally, the image is transmitted to the display unit 1800 and displayed.

For printing the live image after confirming it, a print instruction is inputted from the operation unit 1900. Accordingly, image data to be printed and command groups to be executed are inputted to the image processing unit 1200. The image processing unit 1200 reads out high-resolution image data and processes the read high-resolution image data in accordance with the command groups. By doing so, a repaired image, further a live image are generated accordingly. The generated live image is transmitted to the print controller 1600, and printed by the printer 3000.

A case where command groups are generated by interfacing with the server 1000 is explained above. In a case where command groups are generated in the terminal 2000, a template stored in the template storage unit 1300 is selected by the book subsystem 2350. Further, the image subsystem 2130 receives low-resolution image data from the image pool 1150, then designations for image processes are sequentially inputted from the operation unit 2900 while watching a displayed image on the display unit 2800. The input designations are stored in the image subsystem 2130 as the commands, and, after necessary image processes are performed on the low-resolution image data in accordance with the stored commands, the processed image is displayed on the display unit 2800. Display control during performing the above processes is the same as that performed in the image subsystem 1130. More specifically, a table, similarly to the table 900, is generated in the image subsystem 2130, and the image subsystem 2130 operates in the same manner as the flowchart shown in FIG. 6.

When an image is to be printed as it is displayed on the display unit 2800, an operator inputs a print instruction from the operation unit 2900. In response to the print instruction, the commands groups, as shown in FIG. 7, which are registered in the image subsystem 2130 are sequentially transmitted to the image subsystem 1130 as image processing function. Further, the image subsystem 1130 reads out high-resolution image data from the image pool 1150 and controls the image processing unit 1200 to perform necessary image processes on the high resolution image data. By doing so, a repaired image, further a live image are generated accordingly. The generated live image is transmitted to the print controller 1600, and printed by the printer 3000.

Accordingly, it is possible for the terminal 2000 to apply desired image processes without receiving high-resolution image, and to make the server 1000 to apply the same image processes to the high-resolution image and print out a processed high-resolution image. Thus, the amount of data transmitted between the terminal 2000 and the server 1000 is minimized. More specifically, the data transmitted from the terminal 2000 to the server 1000 is command groups designating image processes and a print instruction in addition to information on a state of the terminal 2000. Further, the data transmitted from the server 1000 to the terminal 2000 is low-resolution image data and template data. Therefore, the aforesaid processing can be realized by transmitting a very small amount of data.

[Flow of Practical Processing]

In follow, processing for generating an album utilizing an "automatic layout function" is explained with reference to FIG. 8 in further detail. The "automatic layout function" is an operation for automatically arranging an image or images at the most appropriate positions in a template when pasting the image or images on the template in consideration of processes to be applied on the image or images.

First, in step S1, image input processing is performed in two kinds of resolutions, namely, low-resolution and high resolution from the image input unit 1120 using, e.g., the scanner 1 and the inputted image data is stored in the image pool 1150, as explained with reference to FIG. 4. Note, it is necessary to input image data of all the images to be processed before initiating image processes. When two kinds of image data of necessary images are already stored in the image pool 1150, the process in step S1 can be skipped.

Then, in step S2, a template is selected out of a plurality of templates stored in the template storage unit 1310. There are different kinds of templates, such as a solid-color template, a template designed with a picture and/or a pattern as a background image, and template whose background image can be freely selected. The operator selects one of those various templates (sample templates) which are provided in advance.

A template can be selected for each page, and a plurality of templates can be selected in accordance with the number of images to be processed and filed in an album. Further, in the template storage unit 1310, a set of templates, i.e., book, which is a correction of a plurality of templates corresponding to a copy of album is also prepared. As the book, a template for a cover page and at least one template for a subsequent page are registered. If the registered pages are not enough to file all the images to be filed in an album, the registered template or templates of the first or subsequent pages are repeatedly used. For example, in a case where templates of a book having a cover page and two main pages (total three pages) had been registered, in the fourth and later pages, the same two templates used in the two main pages are repeatedly used. Thus, in the fourth and fifth pages, the background images are the same as those in the second and third pages. Likewise, these templates are used repeatedly in the sixth and later pages.

Figure 9:
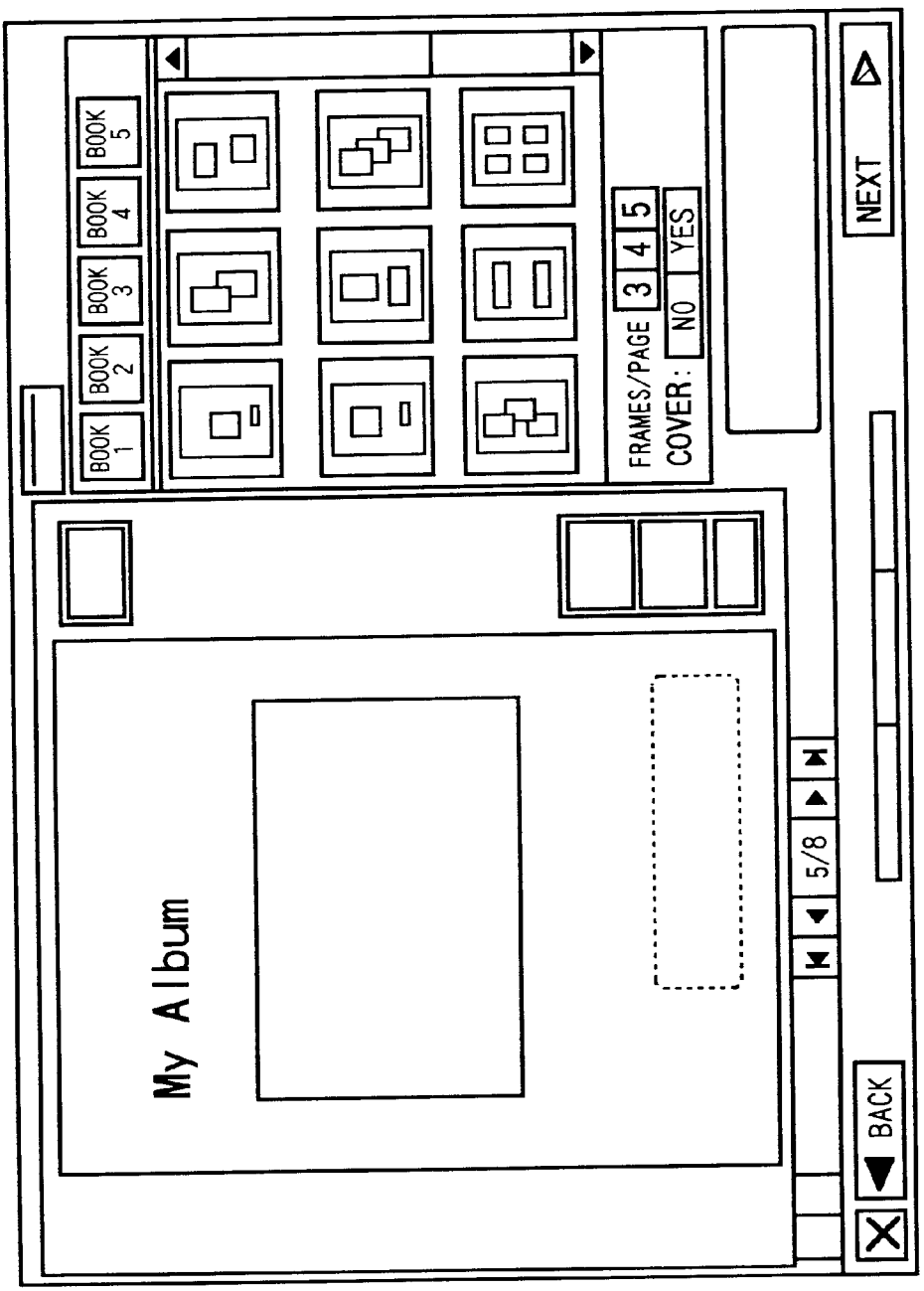
FIG. 9 is a view showing an example of an image for selecting a template and the number of images per page according to the embodiment of the present invention.

An operation image for selecting a template (or a book), displayed on the display unit 1800, using the operation unit 1900 is shown in FIG. 9. The operator can select an arbitrary template out of a plurality of sample templates as shown in the right portion of the display screen in FIG. 9. Initially, a predetermined template is selected as a default template. FIG. 9 shows a case where the operator selected a book in which the number of images to be pasted can be selected with some degree of freedom. In the left portion of the display screen, a template of the cover page of the book is shown.

When the book having the cover page as shown in the left portion of the display screen in FIG. 9 is selected, then in step S3, the maximum number of images to be arranged in a page is selected. In the selected template, either three, four, or five is selected as the maximum number of images per page. Upon selecting the maximum number of images, one out of Frames/Page buttons 3, 4 and 5 is selected. As a default value, 3 is initially selected.

Figure 10:
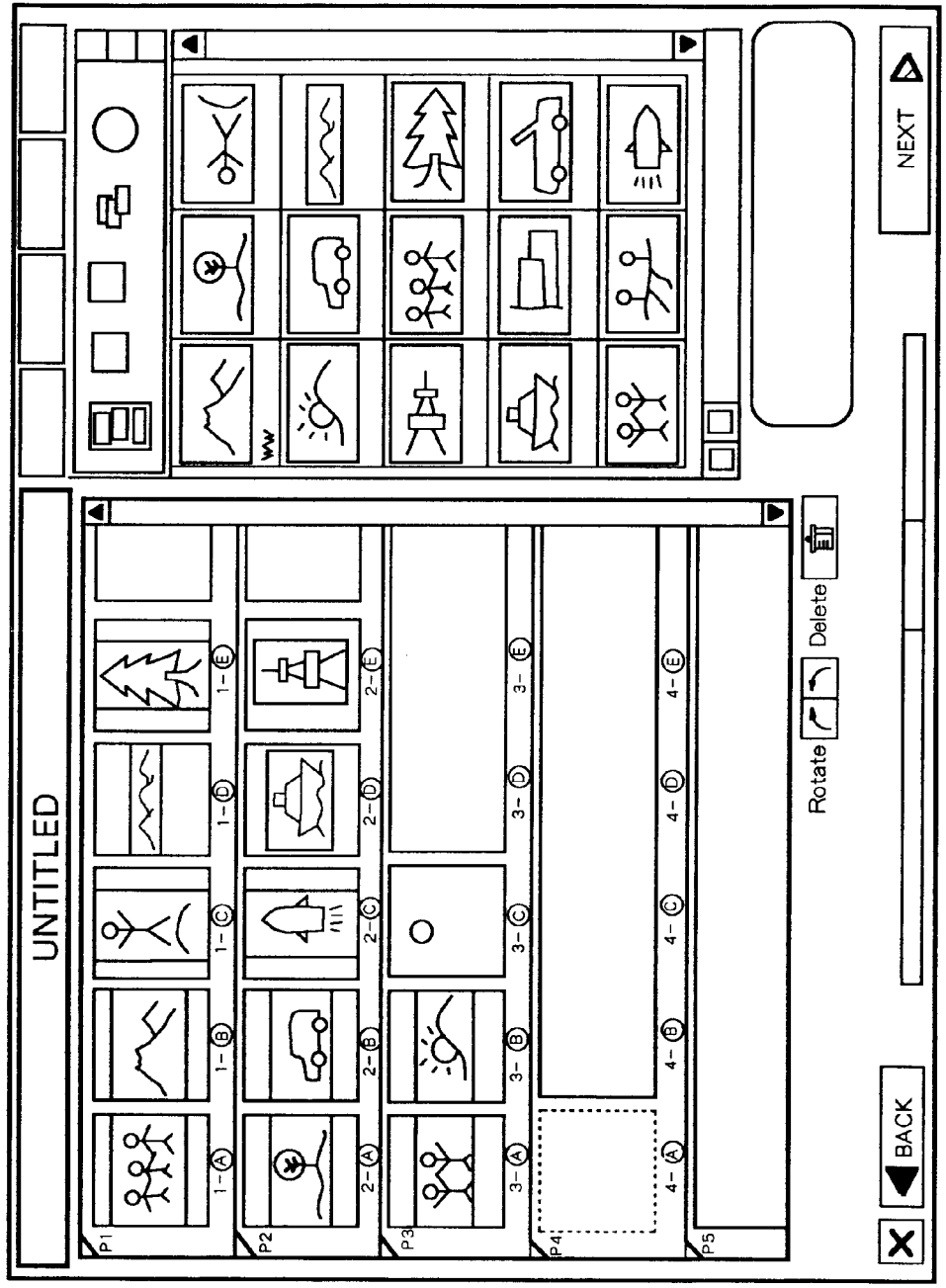
FIG. 10 is a view showing an example of an image for selecting images for making an album in the image processing system according to an embodiment of the present invention.

Thereafter, the process proceeds to step S4 where an image or images to be pasted in each page are selected. FIG. 10 shows an operation image for selecting an image. In FIG. 10, windows shown in the right portion of the display screen are image list windows, and images stored in the image pool 1150 are displayed. The windows in the left portion of the display screen are image selection windows, and an image or images, selected out of the images displayed in the image list windows, to be arranged in respective pages are displayed in the image selection windows.

Each row of the image selection windows corresponds to one page. For example, there are five images in the first row of the image selection windows, and the five images in this row are arranged from the left in a single template (a page of an album) at predetermined positions. Similarly, the second row corresponds to images to be pasted on a template of the second page. Regarding the third row, only two images are selected, therefore, only two images are arranged in the third page. This selection of images determines which image is arranged at which position of the template.

The operator can select an image in an arbitrary order in an arbitrary page by grabbing an arbitrary image displayed in the image list window and dragging it to the desired image selection window using a mouse.

In step S4, in addition to the selection of an image or images, various settings of templates can be performed. For example, the position where an image is pasted can be changed, characters can be inputted, a background image can be changed, and decoration of the frame for an image (e.g., shading) can be changed.

Next in step S5, the order of the images to be arranged in a page, namely, the positions of images are exchanged. The operator is able to move an arbitrary image to an arbitrary position by grabbing the desired image and dragging it in the image selection window in FIG. 10 using the mouse. By performing the aforesaid processes, the number and the order (positions) of images to be pasted on each template are set. Thereafter, the process proceeds to step S6 where whether or not image processes are to be applied to the selected images is determined. In a case of performing image processes, the process proceeds to step S7.

In step S7, an image which the operator wishes to process is selected from the image selection windows, and image processes to be performed are designated, thereby performing necessary image processes on the selected image. A case of rotating images out of the images selected in steps S4 and S5 is explained as an example. Some of the images in the image selection windows are of a portrait size and some of the images are of a landscape size. Thus, if the orientation of an image is inappropriate, it is necessary to rotate the image by 90 degrees either in the clockwise or counterclockwise direction. In FIG. 10, in the lower central portion of the display screen, a button for rotating an image by 90 degrees in the clockwise direction and a button for rotating by 90 degrees in the counterclockwise direction are displayed in the display unit 1800 in accordance with the display control by the image subsystem 1130. The operator selects an image to be rotated by clicking on the corresponding image selection window among the plurality of images displayed in the image selection windows, then designates to rotate the selected image by selecting either the button for rotating in the clockwise direction or the button for rotating in the counterclockwise direction using the mouse.

Thereafter, the process returns to step S6, and whether or not there is any other image process to be performed is determined. If there is, the next image process is designated in step S7.

As described above, it is possible to arbitrarily designate various editorial processes and correction processes, however, possible image processes are predetermined. In the image editorial unit 1210, rotation and trimming processes, for instance, are prepared, and in the image correction unit 1220, image correction processes, such as red-eye compensation, and effect processes, such as facet and blur processes, are prepared. Further, as for processes performed in the additional processing unit 1230, service processes, such as extra-copy making, indexing, enlarging, panoramic synthesis, and automatic album making, are provided. The operator selects a desired process out of these processes upon designating an image process, further, parameters may be set for, e.g., designating an area of an image to be processed if necessary.

After the desired image process or processes have been designated for all the selected images, the process proceeds from step S6 to step S10, where automatic layout processing is performed. In the automatic layout processing, the images displayed in each row of the image selection windows are automatically arranged in one page. Note, in the automatic layout processing, positions where images are to be temporarily pasted are predetermined as a default layout, and the images are temporarily arranged in the page in accordance with the order of the images in the image selection windows in the same row. Now, since the images may have different aspect ratios, and some images may have a portrait size whereas some images may have a landscape size, in the initial layout, some images may greatly overlap each other. Therefore, the positions of the images are subsequently moved slightly for fine adjustment so that overlapping area or areas become small. This fine adjustment is performed by obtaining each overlapping area and determining whether or not the area is larger than a predetermined value, thereby evaluating the overlapping area. If the overlapping area is larger than the predetermined value, then the positions of images are slightly moved so as to reduce the overlapping area to be under the predetermined value.

Then, in step S11, a result of the layout of the images are displayed on the display unit 1800. The operator checks the displayed image, and if he/she determines to perform further image processes (NO in step S12), then the process returns to step S6.

When the operator is not satisfied with the result of this automatic layout, it is possible to rearrange the images using another automatic layout which performs fine adjustment in accordance with different conditions. Furthermore, if the operator is not satisfied with the result of the other automatic layout, it is possible for the operator to manually change the layout.

When the operator is satisfied with the displayed result of the layout, then the process proceeds to step S15 where print operation is designated. In response to the designation, the high-resolution image data read from the image pool 1150 is applied with the image processes which have been designated. Then, a resultant image is transmitted to the print controller 1600, further printed by the printer 3000.

Figure 8:
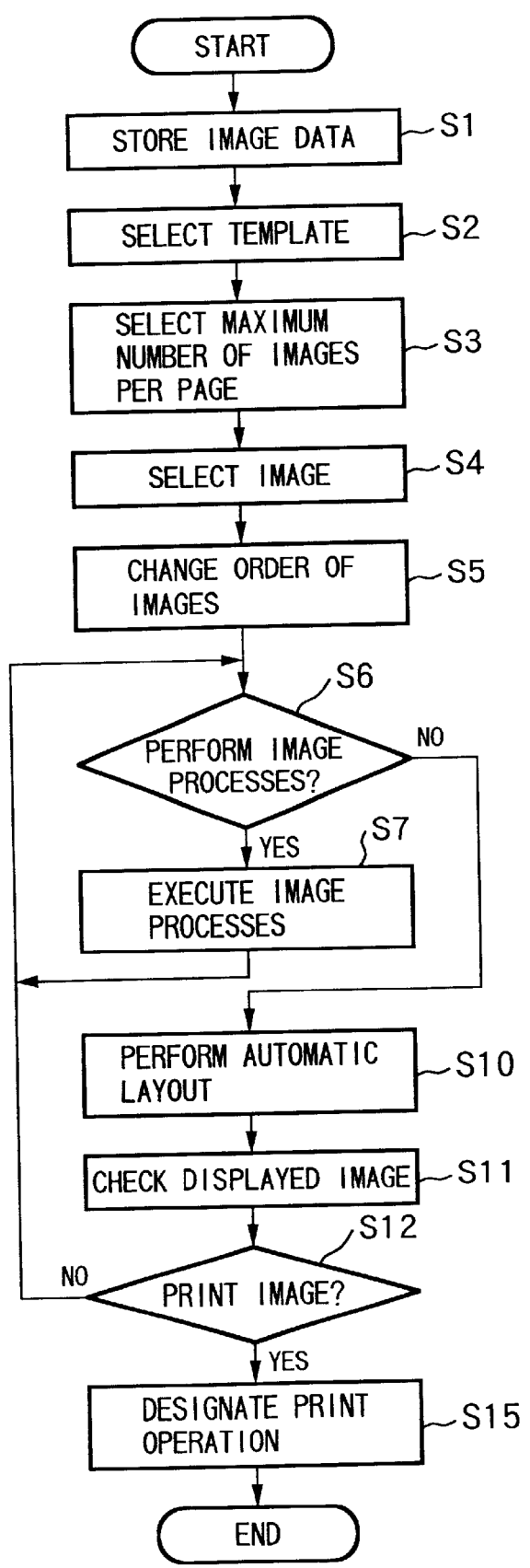
FIG. 8 is a flowchart of processing in the image processing system according to the embodiment of the present invention.

In the flowchart shown in FIG. 8, the automatic layout is performed after image processes for each image have been completed. However, the present invention is not limited to this, and it is possible to perform the automatic layout after the selection of images is completed in step S5, display an entire image obtained by pasting the selected images on a template, and designate correction and/or editorial processes to be applied on the images while watching the displayed image.

Further, in the embodiment, various settings of templates (e.g., decoration of the frame of a pasted image) are performed in step S4, however, they can be performed after the process in step S6 or after step S11 while watching an image obtained as a result of automatic layout.

Furthermore, in the embodiment, each original image is inputted as two types of image data, namely, high-resolution image data and low-resolution image data. However, the present invention is not limited to this, and each original image may be read in three or more different resolutions. In such cases, image processes are designated while referring to image data of the lowest resolution, and image data of one of these resolutions, selected depending upon the purpose of utilization of the image, is applied with the designated image processes and outputted.

Further, the present invention can be applied to a system constituted by a plurality of devices (e.g., host computer, interface, reader, printer) or to an apparatus comprising a single device (e.g., copying machine, facsimile machine).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

According to the above embodiment, low-resolution image data is stored for display, high-resolution image data is stored for printing, and designations of image processes commonly performed on both the low- and high-resolution image data are stored. Accordingly, it becomes unnecessary to thin out image data when displaying an image nor interpolate image data when printing out an image at real time in synchronization with timing of outputting the image data, which reduces a load of resolution conversion.

Further, since the image process commands which had been designated while watching a displayed image are stored, it is unnecessary to designate the same image processes twice to process image data of two different resolutions. For example, when it is necessary to designate identical image processes to be performed on respective images for displaying and printing, sometimes, it is not physically possible to designate exactly the same image processes (e.g., in a case of designating an area, to be processed, of images using a mouse) for both the images. However, according to the present invention, differences, which have occurred conventionally, between image processes performed on the images does not occur.

Furthermore, if the image processing system comprises a plurality of terminals, it is not necessary for a server to transmit high-resolution image data to each terminal for designating image processes in the terminal, and only low-resolution image data used for display needs to be transmitted. Furthermore, in a case where image processes designated in a terminal are to be performed on an input image stored in the server and a resultant image is to be printed out in the server, the designation for the image processes are to be transmitted from the terminal to the server, which minimizes an amount of data transmitted from the terminal to the server for printing out a desired image.

Further, when plural different sets of image processes are to be performed on a single image, it is possible to use designations of image processes which have been designated previously, therefore, it is possible to prevent the designating of the same image processes from being duplicated.

Thus, according to the present invention, it is possible to provide a high-quality image processing apparatus capable of effectively designating image processes when an original image is to be performed with image processes designated by an operator and to be outputted in a plurality of different resolutions, as well as outputting a resultant image at high speed.

In addition, it is possible to provide an image processing system, comprising a server and a terminal, capable of minimizing the amount of data transmitted between the server and the terminal as well as performing desired image processes on an image stored in the server in response to an operation by an operation performed in the terminal, further outputting a resultant image from the server.

The present invention is not limited to the above embodiments and various changes and modifications can be made within the spirit and scope of the present invention. Therefore to apprise the public of the scope of the present invention, the following claims are made.

What is claimed is:

1. An image processing apparatus comprising:

image storage means for storing image data of an image;

process command storage means for storing, in relation to each image to be processed, commands for plural kinds of image processes to be performed on the image as a set of first and second command groups, the first command group consisting of commands for image correction processes and the second command group consisting of commands for image editorial processes;

classifying means for classifying the commands for plural kinds of the image processes to be performed on the image data into the first command group and the second command group; and image process means for performing the image processes corresponding to the set of the first and second command groups stored in said process command storage means on the image, wherein the commands for the image processes in each group classified by said classifying means are stored in said process command storage means, and wherein said image process means performs the image correction processes corresponding to the first command group stored in said process command storage means on the image data stored in said image storage means, and performs the image editorial processes corresponding to the second command group stored in said process command storage means on the image data subjected to the image correction processes.

2. The image processing apparatus according to claim 1, wherein said image storage means stores first image data of the image expressed in a first resolution and second image data of the image expressed in a second resolution which is higher than the first resolution.

3. The image processing apparatus according to claim 2, wherein said image process means performs the image processes corresponding to the set of the first and second command groups on the first image data and the second image data.

4. An image processing apparatus comprising:

image storage means for storing image data of at least one original image;

process command storage means for storing, in relation to parameters that identify each original image to be processed, commands for plural kinds of image processes to be performed on the corresponding original image as a set of first and second command groups, the first command group consisting of commands for image correction processes input by a user for the original image, and the second command group consisting of commands for image editorial processes input by the user for the original image; and image process means for performing the image processes corresponding to the set of the first and second command groups stored in said process command storage means on the original image, wherein said image process means performs the image correction processes corresponding to the first command group stored in said process command storage means on the image data of the corresponding original image stored in said image storage means, and performs the image editorial processes corresponding to the second command group stored in said process command storage means on the image data of the original image after it has been subjected to the image correction processes.

5. The image processing apparatus according to claim 1, wherein one of the first and second command groups in the set can be replaced by another command group, and said image process means performs the image processes corresponding to an obtained new set of a plurality of command groups.

6. The image processing apparatus according to claim 1, wherein the commands for the image processes are stored in said process command storage means as functions for designating the image processes.

7. An image processing system having a server and at least one terminal which are connected to each other, wherein said server comprises:
image storage means for storing first image data of an image expressed in a first resolution and second image data of the image expressed in a second resolution which is higher than the first resolution;
transmitting means for transmitting the first image data stored in said image storage means to said terminal; and
image processing means for performing image processes on the second image data stored in said image storage means, and said terminal comprises:
receiving means for receiving the first image data transmitted from said server;
process command storage means for storing commands for plural kinds of image processes to be performed on the first image data as a set of first and second command groups, the first command group consisting of commands for image correction processes and the second command group consisting of commands for image editorial processes; and
output means for performing the image processes corresponding to the set of first and second command groups stored in said process command storage means on the first image data received from said server, said output means performing the image correction processes corresponding to the first command group on the first image data, and performing the image editorial processes corresponding to the second command group on the first image data subjected to the image correction processes,
wherein the set of first and second command groups stored in said process command storage means are transmitted from said terminal to said server, and said image process means at said server performs the image processes corresponding to the set of first and second command groups transmitted from said terminal on the second image data stored in said image storage means, said image process means performing the image correction processes corresponding to the first command group on the second image data, and performing the image editorial processes corresponding to the second command group on the second image data subjected to the image correction processes.

8. An image processing method comprising:
a storing step of storing image data of an image;
a registering step of registering, in relation to each image to be processed, commands for plural kinds of image processes to be performed on the image as a set of first and second command groups, the first command group consisting of commands for image correction processes and the second command group consisting of commands for image editorial processes;
a classifying step of classifying the commands for the plural kinds of the image processes to be performed on the image data into the first command group and the second command group; and
a processing step of performing the image processes corresponding to the set of the first and second command groups registered in said registering step on the image,
wherein the commands for the image processes in each group classified in said classifying step are registered in said registering step, and
wherein, in said processing step, the image correction processes corresponding to the first command group registered in said registering step are performed on the image data stored in said storing step, and the image editorial processes corresponding to the second command group registered in said registering step are performed on the image data subjected to the image correction processes.

9. The image processing method according to claim 8, wherein, in said storing step, the first image data of the image expressed in a first resolution and the second image data of the image expressed in a second resolution which is higher than the first resolution is stored.

10. The image processing method according to claim 9, wherein, in said processing step, the image processes corresponding to the set of the first and second command groups are performed on the first image data and the second image data.

11. An image processing method comprising:
a storing step of storing image data of at least one original image;
a registering step of registering, in relation to parameters that identify each original image to be processed, commands for plural kinds of image processes to be performed on the corresponding original image as a set of first and second command groups, the first command group consisting of commands for image correction processes input by a user for the original image, and the second command group consisting of commands for image editorial processes input by the user for the original image; and
a processing step of performing the image processes corresponding to the set of the first and second command groups stored in said process command storage means on the original image,
wherein, in said processing step, the image correction processes corresponding to the first command group stored in said process command storage means on the image data of the corresponding original image stored in said image storage means, and performs the image editorial processes corresponding to the second command group stored in said process command storage means on the image data of the original image after it has been subjected to the image correction processes.

12. The image processing method according to claim 8, wherein one of the first and second command groups in the set can be replaced by another command group, and the image processes corresponding to an obtained new set of a plurality of command groups is performed.

13. An image processing method for an image processing system having a server and at least one terminal, comprising:

an image storing step of storing first image data of an image expressed in a first resolution and second image data of the image expressed in a second resolution which is higher than the first resolution at the server;

a receiving step of receiving the first image data from the server at the terminal;

a command registering step of registering commands for plural kinds of image processes to be performed on the first image data as a set of first and second command groups, the first command group consisting of commands for image correction processes and the second command group consisting of commands for image editorial processes;

an output step of performing the image processes corresponding to the set of the first and second command groups registered in said command registering step on the first image received from the server at the terminal, the image correction processes corresponding to the first command group being performed on the first image data, and the image editorial processes corresponding to the second command group being performed on the first image data subjected to the image correction processes;

a transmitting step of transmitting the set of the first and second command groups registered in said command registering step to the server from the terminal; and an image process step of performing the image processes corresponding to the set of the first and second command groups transmitted from the terminal on the second image data stored in said image storing step at the server, the image correction processes corresponding to the first command group being performed on the second image data, and the image editorial processes corresponding to the second command group being performed on the second image data subjected to the image correction processes.

14. A computer program product comprising a computer usable medium having computer readable program code means embodied in said medium for applying image processes to image data and outputting the image data, said product including:

first computer readable program code means for storing image data of an image;

second computer readable program code means for registering, in relation to each image to be processed, commands for plural kinds of image processes to be performed on the image as a set of first and second command groups, the first command group consisting of commands for image correction processes and the second command group consisting of commands for image editorial processes;

third computer readable program code means for classifying the commands for plural kinds of the image processes to be performed on the image data into the first command group and the second command group, wherein the commands for the image processes in each group classified by said third computer readable program code means are registered in said second computer readable program code means; and fourth computer readable program code means for performing the image processes corresponding to the registered set of the first and second command groups on the stored image data, the image correction processes corresponding to the first command group being performed on the stored image data, and the image editorial processes corresponding to the second command group being performed on the image data subjected to the image correction processes.

15. A computer program product comprising a computer usable medium having computer readable program code means embodied in said medium for applying image processes to image data and outputting the image data, said product including:

first computer readable program code means for storing image data of at least one original image;

second computer readable program code means for registering, in relation to parameters that identify each original image to be processed, commands for plural kinds of image processes to be performed on the corresponding original image as a set of first and second command groups, the first command group consisting of commands for image correction processes input by a user for the original image, and the second command group consisting of commands for image editorial processes input by the user for the original image; and third computer readable program code means for performing the image processes corresponding to the set of the first and second command groups stored in said process command storage means on the image data corresponding to the original image, the image correction processes corresponding to the first command group stored in said process command storage means being performed on the image data of the corresponding original image stored in said image storage means, and the image editorial processes corresponding to the second command group stored in said process command storage means being performed on the image data of the original image after it has been subjected to the image correction processes.

16. The image processing apparatus according to claim 1, further comprising reading means for reading the image and outputting the image data, wherein said image storage means stores the image data output from said reading means.

17. The image processing apparatus according to claim 1, further comprising inputting means for inputting the commands for plural kinds of image processes, wherein said classifying means classifies the commands input by said inputting means into the first and second command groups.

18. The image processing apparatus according to claim 1, further comprising display means for displaying an image based on the image data stored in said image storage means, the image data subjected to the image correction processes or the image data subjected to the image editorial processes.

19. The image processing apparatus according to claim 1, further comprising receiving means for receiving the commands for plural kinds of image processes from a terminal at a remote location, wherein said classifying means classifies the commands received by said receiving means into the first and second commands groups.

20. The image processing apparatus according to claim 1, further comprising printing means for printing an image based on the image data subjected to the image correction processes and the image editorial processes by said image process means.

21. The image processing system according to claim 7, wherein said server further comprises reading means for reading the image and outputting the first and second image data, and said image storage means stores the first and second image data output from said reading means.

22. The image processing system according to claim 7, wherein said terminal further comprises inputting means for inputting the commands for plural kinds of image processes, and said process command storage means stores the commands input by said inputting means.

23. The image processing system according to claim 7, wherein said terminal further comprises display means for displaying an image based on the first image data received from said server, the first image data subjected to the image correction processes, or the first image data subjected to the image editorial processes.

24. The image processing system according to claim 7, wherein said server further comprises printing means for printing an image based on the second image data subjected to the image correction processes and the image editorial processes.

25. The image processing method according to claim 8, further comprising a reading step of reading the image and outputting the image data, wherein the output image data is stored in said storing step.

26. The image processing method according to claim 8, further comprising an inputting step of inputting the commands for plural kinds of image processes, wherein the input commands are classified into the first and second command groups in said classifying step.

27. The image processing method according to claim 8, further comprising a displaying step of displaying an image based on the image data stored in said storing step, the image data subjected to the image correction processes or the image data subjected to the image editorial processes.

28. The image processing method according to claim 8, further comprising a receiving step of receiving the commands for plural kinds of image processes from a terminal at a remote location, wherein the received commands are classified into the first and second command groups in said classifying step.

29. The image processing method according to claim 8, further comprising a printing step of printing an image based on the image data subjected to the image correction processes and the image editorial processes in said processing step.

30. The image processing method according to claim 13, further comprising a reading step of reading the image and outputting the first and second image data at the server, and the output first and second image data is stored in said image storing step.

31. The image processing method according to claim 13, further comprising an inputting step of inputting the commands for plural kinds of image processes at the terminal, and the input commands are registered in said command registering step.

32. The image processing method according to claim 13, further comprising a displaying step of displaying an image based on the first image data received from said server, the first image data subjected to the image correction processes, or the first image data subjected to the image editorial processes at the terminal.

33. The image processing method according to claim 13, further comprising a printing step of printing an image based on the second image data subjected to the image correction processes and the image editorial processes at the server.

\* \* \* \* \*

UNITED STATES PATENT AND TRADEMARK OFFICE
CERTIFICATE OF CORRECTION

PATENT NO. : 6,282,330 B1
DATED : August 28, 2001
INVENTOR(S) : Masayuki Yokota et al.

Page 1 of 1

It is certified that error appears in the above-identified patent and that said Letters Patent is hereby corrected as shown below:

Title page,
Under Item [56], References Cited, U.S. PATENT DOCUMENTS,
"5,467,202   11/1995   Washino et al." should read
-- 5,467,202   11/1995   Washio et al. --.

Column 1,
Line 10, "the" should read -- a --.

Column 7,
Line 61, "then" should be deleted.

Column 8,
Line 19, "sever" should read -- server --.

Column 9,
Line 57, "performed . In" should read -- performed. In --.

Column 11,
Line 23, "commands" should read -- command --; and
Line 48, "follow," should read -- the following, --.

Column 15,
Line 43, "does" should read -- do --.

Column 20,
Line 62, "commands" should read -- command --.

Signed and Sealed this

Ninth Day of April, 2002

Attest:

Attesting Officer

JAMES E. ROGAN
Director of the United States Patent and Trademark Office